United States Patent Office 3,214,223
Patented Oct. 26, 1965

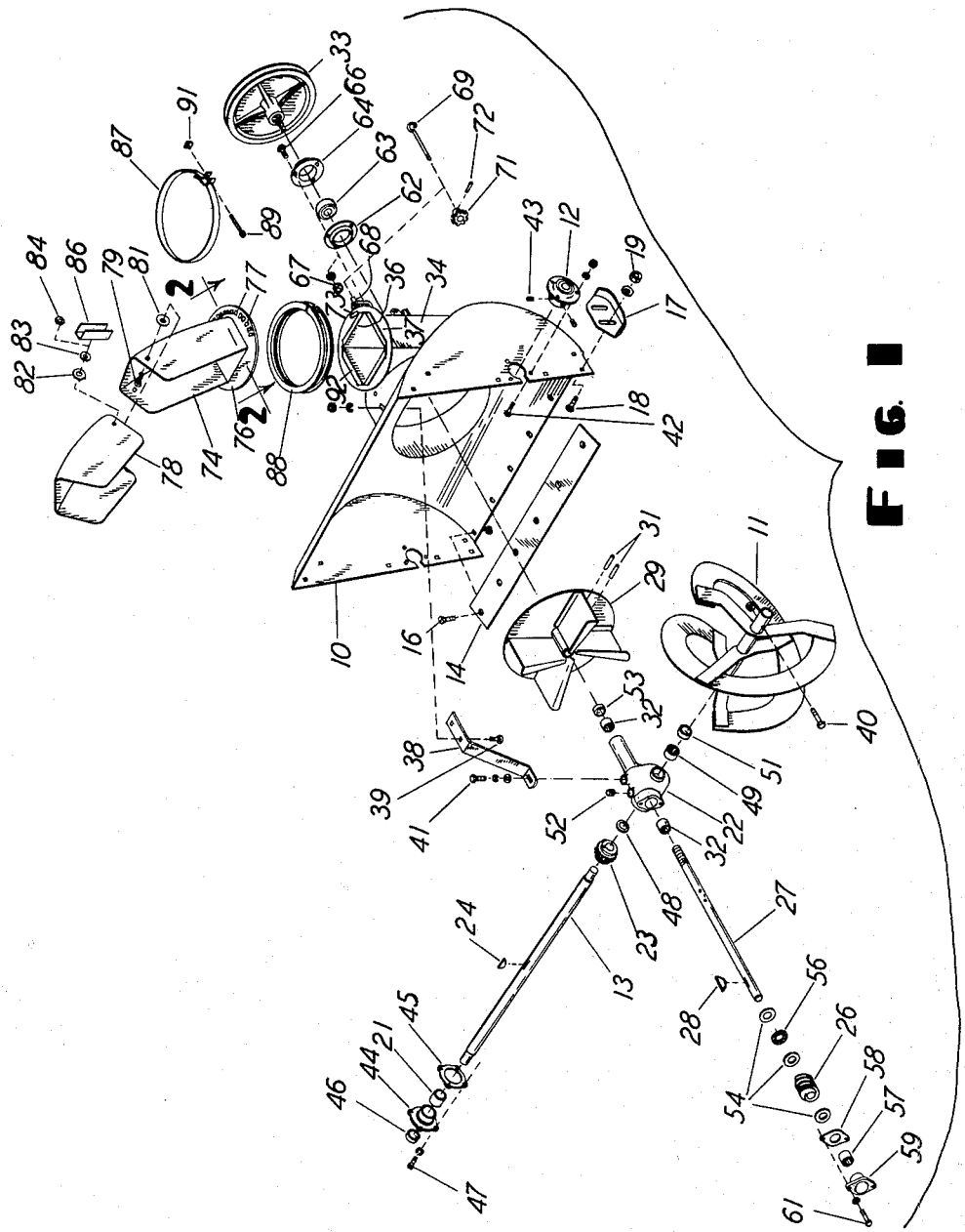

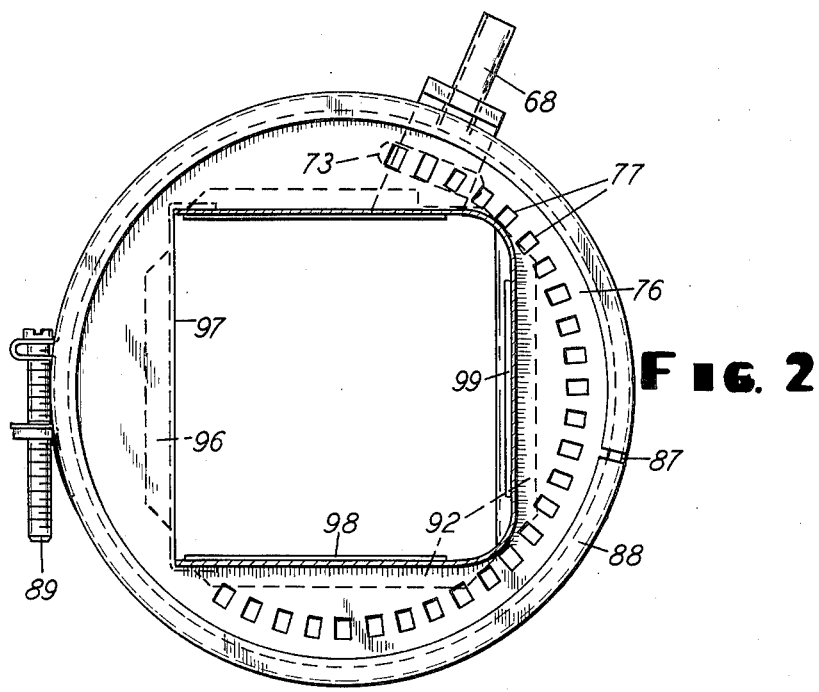
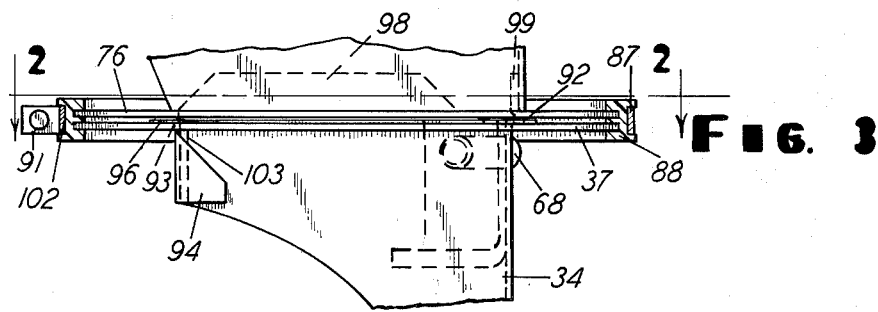
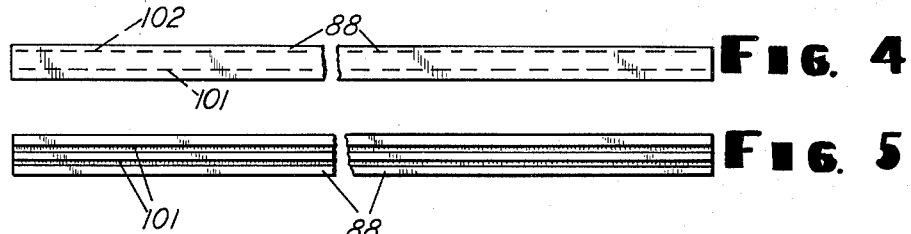
INVENTORS:
WARREN H. PRICE
JAMES S. HAYEK
BY: *Arthur J. Hansmann*
ATTORNEY

3,214,223
MOUNTING FOR A ROTATABLE CHUTE
Warren H. Price, South Milwaukee, and James S. Hayek, Racine, Wis., assignors to Jacobsen Manufacturing Co., Racine, Wis., a corporation of Wisconsin
Filed July 29, 1964, Ser. No. 385,851
6 Claims. (Cl. 302—61)

This invention relates to a mounting for a material handling chute which is rotatable.

This particular invention has application in the art of snow blowers which have rotatable chutes for directing the snow as desired. Snow blowers of the type which utilize a pickup means, such as an auger, and convey the snow to the chute by means of a blower, are well known in the art. It is of course important in these machines that the chute be movable to direct the snow generally to either side of the blower or machine itself. In providing directional or rotatable chutes for snow blowers, there is a problem of having the chute off-set with respect to a mounting plate or the like so that the chute can of course direct the blown snow in a desired direction with respect to the horizontal. Thus where the chute over-hangs or is cantilevered with respect to the face or mounting plate, there is concern about being able to securely mount the chute but yet have it rotate as mentioned.

It is a general object of this invention to provide a mounting for a material handling chute wherein the chute can be rotated to any suitable position while still maintaining the chute in a sturdy and reliable mounting. Thus in accomplishing this particular object, the chute mounting of this invention is arranged to securely hold the chute but yet permit it to be freely rotatable and to have it fully conduct the material from the mounting base and into and through the chute without undue impediments or leakage with respect to the material.

Another object of this invention is to provide a chute mounting wherein the chute can be easily rotated to a desired plurality of positions in any increment or selected position within the range of rotation.

Still another object of this invention is to provide a chute mounting which accommodates a rotatable chute and which is freely movable without any conventional type of lubrication such as oil or grease as the mounting is in the nature of a self-lubricating construction by virtue of the material being used.

Still another object of this invention is to provide a rotatable chute mounting for a snow blower wherein the mounting will not be conducive to water and snow freezing on the mounting to impede the rotation of the chute. There is no metal-to-metal contact.

Still other objects of this invention are to provide a rotatable chute mounting which is inexpensive and easily provided and maintained and which can be readily assembled and disassembled for the usual purposes, and which does not rattle, bind, or freeze.

Other objects and advantages become apparent upon reading the following description in light of the accompanying drawings wherein:

FIG. 1 is an exploded view of the pickup and blower portion of a conventional type of snow blower except for the chute mounting described and claimed herein.

FIG. 2 is an enlarged plan view of the chute mounting shown in FIG. 1, and with the view being sectioned on the line 2—2 of FIG. 1, and also being taken on the line 2—2 of FIG. 3.

FIG. 3 is a side elevational view of FIG. 2 with parts thereof broken away.

FIG. 4 is a top plan view shown in the previous views but shown in the original position and with the central portion thereof broken away.

FIG. 5 is a side elevational view of that shown in FIG. 4.

FIG. 1 shows the general arrangement of the pickup section of a snow blower with the auger housing 10 and the auger 11 which would of course be rotatably disposed within the housing 11 by means of the bearing 12 on each end of the auger shaft 13 The housing 10 also has a scraper blade 14 secured by means of the screw 16, and the housing is supported on a skid 17 secured by a bolt 18 and nut 19.

The auger shaft 13 of course extends into the auger 11 and is supported in the bearing 12 and the bearing 21. The shaft 13 also extends through the gear housing 22 and the worm wheel 23 is secured to the shaft by the key 24 to be driven by the worm 26 secured to a fan shaft 27 by a key 28. Also a fan 29 is secured to the shaft 27 by the pins 31 which extend into the shaft 27 as the latter is mounted in the housing 22 by the bearings 32. The shaft 27 is threaded into a driven pulley 33 which is powered by a prime mover (not shown) and is generally a gasoline engine.

Thus it will be understood that the pulley 33 rotates the shaft 27 which in turn rotates the blower 29 and the auger shaft 13 and its auger 11 so that snow is picked up by the auger 11 and passed to the fan or blower 29 and thus is passed into the auger housing portion 34 which has its upright opening 36 extending therein and which terminates in a plate 37. The gear housing 22 is supported on the auger housing 10 by means of a bracket 38 secured by bolts, such as bolt 39, to the housing, and secured by a screw 41 connecting to the gear housing.

Other shown details of the general arrangement include the bolts, such as bolt 42, and screws, such as screw 43, for mounting the bearing 12. Auger bolt 40 is also shown and gasket 45, housing cover 44, seal 46 and screw 47 are shown on the far end of the shaft 13. A washer 48 and bearing 49 and seal 51 are also shown, to be mounted on the shaft 13. The gear housing 22 has a plug 52.

The shaft 27 has a seal 53 and washers 54 and a bearing 56 and another bearing 57 and a gasket 58. An end cover 59 is provided for the end of the shaft 27 and is assembled with the screws, such as screw 61. The shaft 27 also has a flange 62 and a bearing 63 which is intermediate another flange 64 with these parts being assembled by the bolts, such as bolt 66, and nuts, such as nut 67.

The housing portion 34 has a sleeve 68 which rotatably receives the hooked rod 69 which in turn has a sprocket 71 secured thereto by a pin 72. It will therefore be understood that the rod 69 is rotated by means, not shown, but any suitable crank or like control means, so that the rod 69 rotates and in turn rotates the sprocket 71. The sprocket projects through a substantially rectangular opening 73 in the flange 37 of the housing.

A chute 74 is disposed over the housing portion 34 and has a flange 76 which mates with the flange 37, and the chute 74 is rotatable over and with respect to the stationary housing flange 37. The means for rotating is the sprocket 71 which engages sprocket openings 77 in the chute plate 76. A deflector 78 is movably mounted on the upper end of the chute 74 by means of the pivot bolt 79 which has a washer 81 and is secured by the nut 82 having a washer 83 and a nut 84 which secures a wing nut type of member 86.

A tension band 87 encircles a retaining member 88 which engages the flanges 37 and 76 in a manner described hereinafter. The band 87 secures the retaining member to the flanges, and a bolt 89 and nut 91 are connected to the band 87 for the securing function mentioned.

FIGS. 2 and 3 also show the housing portion 34 and the plate 37, and the portion 34 has tabs 92 which extend through the central opening in the plate 37, and such opening is designated 93. The tabs 92 can of course be secured to the plate 37, and the tabs extend on only three sides of the square opening 93 while a filler piece 94 extends on the fourth side and has a tab 96 also overlapping the plate 37 and this permits necessary tolerance and adjustment.

FIG. 3 thus shows the chute plate 76 spaced from the tabs 92 and 96 so that the two plates 37 and 76 are spaced apart. The plate 76 of course has its opening 97 to axially align with the opening 93 so that material can pass beyond the two plates. Also, the chute 74 is affixed to the plate 76 by the latter having tabs 98 and 99 extending upwardly into the three-sided chute 74. Of course the fourth side of the chute is shown open so that the material can be exhausted out that side as desired.

The retaining member 88 is shown to be E-shaped in cross-section and has two grooves 101 on one side thereof and one groove 102 on the opposite side thereof. The grooves 101 are of course spaced apart and receive the edges of the plates 37 and 76 respectively. The groove 102 receives the band 87 as shown.

The retaining member 88 is made of a polyethylene plastic material and is of course a straight formed strip shaped as described. The straight strip is shown in FIGS. 4 and 5 and it can then be cut to the desired length to extend around the circumferences of the plates 37 and 76 in the position shown in FIGS. 1, 2 and 3. The plastic material permits the rotation of the chute 74 without the requirement of any lubrication since it is in itself self-lubricating and it is silent in its support of the rotating chute and it will not invite water and snow to freeze thereon to bind the plates together, but will of course provide a sturdy mounting for the chute 74. The band 87 is of course adjustably secured in the groove 102 and can be tightened to the degree necessary to hold the retaining member 88 to the plates.

Thus the plates 37 and 76 are of the same diameter, and the strip 88 has its grooves 101 spaced apart a distance greater than the thickness of the tabs 92 and 96 so that the weight of the chute 74 is supported by the strip, and the plates are spaced apart.

The chute portions 34 and 74 are both three-sided, and FIG. 3 shows the portion 34 to terminate at the line designated 103, and the filler piece 94 thus extends between the opposite sides of the piece 34 to dispose its tab 96 as mentioned. The piece 94 would of course be welded or otherwise secured to the housing portion 34, and this permits the plate opening 93 and the portion 34 to have certain tolerances as the piece 94 simply fills in the fourth side of the housing.

While a specific embodiment of this invention has been shown and described, it should be obvious that certain changes could be made therein, and the invention should therefore be determined only by the scope of the appended claims.

What is claimed is:

1. A mounting for a material handling chute comprising two circular plates disposed parallel and co-axial and having aligned central openings for the passage of material therethrough, said plates being relatively rotatable about the axis thereof, a strip having grooves in the opposite sides thereof and extended around and receiving the circumferential edges of said plates in said grooves on one side of said strip and axially retaining said plates together, and an adjustable band extended around said strip in said groove in the other side of said strip for releasably retaining said strip on said circumferential edges.

2. A mounting for a material handling chute comprising two circular plates disposed parallel and co-axial and being of the same diameter and having aligned central openings for the passage of material therethrough, said plates being spaced apart and relatively rotatable about the axis thereof, a strip of flexible material having two grooves in one side thereof and a groove in the other side thereof and extended around and separately receiving the circumferential edges of said plates in said two grooves on one side of said strip and axially retaining said plates in space relation, and an adjustable band extended around said strip in said groove in the other side of said strip for retaining said strip on said circumferential edges.

3. A directionally adjustable chute for handling material, comprising two circular plates disposed parallel and co-axial and having aligned central openings for the passage of material therethrough, chute sections attached to said plates for conducting material with respect to said openings, one of said plates being fixedly mounted and the other of said plates being rotatable about the axis thereof, rotational drive means connected to said rotatable plate for rotating the latter, a flexible strip of material having grooves in the side thereof and extended around and receiving the circumferential edges of said plates in said grooves of said strip and axially retaining said plates, and means on said strip for retaining said strip on said circumferential edges.

4. A directionally adjustable chute for a snow blower, comprising two circular plates disposed parallel and spaced apart and having aligned central openings for the passage of snow therethrough, one of said plates being rotatable relative to the other of said plates and having slots spaced therearound, chute sections attached to said plates for conducting material with respect to said openings, a flexible strip of plastic material receiving the circumferential edges of said plates and having two grooves with the height of each related to the thickness of said plates for snugly receiving the latter and retaining said plates in spaced-apart and rotatable relation, means connected to said plastic strip for releasably maintaining the latter on said plates, and a sprocket rotatably mounted and engaged with said slots for rotating said one of said plates.

5. A directionally adjustable chute for a snow blower, comprising two circular plates disposed parallel and spaced apart and having aligned central openings for the passage of snow therethrough, one of said plates being fixed and the other being rotatable and having slots spaced therearound, three-sided chute sections for conducting material therethrough, and having an open fourth side, said plates and said chute sections being connected together, a member attached between one of said chute sections and said fixed one of said plates and extending across said open side, a flexible strip of plastic material receiving the circumferential edges of said plates and having two grooves with the height of each related to the thickness of said plates for snugly receiving the latter and with said grooves being spaced apart and retaining said plates in spaced-apart and rotatable relation, means connected to said plastic strip for releasably maintaining the latter on said plates, and a sprocket rotatably mounted and engaged with said slots for rotating said one of said plates.

6. A directionally adjustable chute for a snow blower, comprising two circular plates disposed parallel and spaced apart and having aligned central openings for the passage of snow therethrough, one of said plates being rotatable relative to the other of said plates, chute sections attached to said plates for conducting material with respect to said openings and said plates and said chute sections being connected together, a flexible strip of plastic material E-shaped in cross section and snugly receiving the circumferential edges of said plates in the two spaced-apart grooves of the E-shape for retaining said plates in spaced-apart and rotatable relation, means operatively associated with said plastic strip for releasably maintaining the latter on said plates, and means operatively associated with said one of said plates for rotating the same.

References Cited by the Examiner

UNITED STATES PATENTS

| 513,167 | 1/94 | Woodhouse | 285—272 |
| 2,400,880 | 5/46 | Hoppmann et al. | 98—40 |
| 2,426,423 | 8/47 | Woolsey | 285—367 X |
| 2,474,431 | 6/49 | Lipman et al. | 285—367 |
| 3,075,813 | 1/63 | Vohl | 302—61 |

SAMUEL F. COLEMAN, *Primary Examiner.*